(12) United States Patent
McCusker (10) Patent No.: US 8,659,471 B1
(45) Date of Patent: Feb. 25, 2014

(54) SYSTEMS AND METHODS FOR GENERATING AIRCRAFT HEIGHT DATA AND EMPLOYING SUCH HEIGHT DATA TO VALIDATE ALTITUDE DATA

(75) Inventor: Patrick D. McCusker, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 193 days.

(21) Appl. No.: 13/193,788

(22) Filed: Jul. 29, 2011

(51) Int. Cl.
*G01S 13/08* (2006.01)

(52) U.S. Cl.
USPC ............................ 342/123; 342/118; 342/121

(58) Field of Classification Search
USPC .............................. 342/33–35, 118, 140–146
See application file for complete search history.

(56) References Cited

U.S. PATENT DOCUMENTS

| | | | | |
|---|---|---|---|---|
| 3,177,484 | A * | 4/1965 | Case, Jr. et al. | 342/33 |
| 4,954,837 | A * | 9/1990 | Baird et al. | 342/458 |
| 5,448,241 | A * | 9/1995 | Zeoli et al. | 342/25 A |
| 6,055,477 | A * | 4/2000 | McBurney et al. | 701/469 |
| 6,094,607 | A * | 7/2000 | Diesel | 701/4 |
| 6,389,354 | B1 * | 5/2002 | Hicks et al. | 701/514 |
| 7,145,501 | B1 * | 12/2006 | Manfred et al. | 342/120 |
| 7,420,464 | B2 * | 9/2008 | Fitzgerald et al. | 340/539.13 |
| 2005/0182530 | A1 * | 8/2005 | Murphy | 701/16 |
| 2008/0109160 | A1 * | 5/2008 | Sacle et al. | 701/208 |
| 2009/0153363 | A1 * | 6/2009 | Lapp | 340/973 |
| 2009/0189787 | A1 * | 7/2009 | Khatwa | 340/970 |

OTHER PUBLICATIONS

U.S. Appl. No. 12/892,546, filed Sep. 28, 2010, Bell et al.

* cited by examiner

*Primary Examiner* — John B Sotomayor
*Assistant Examiner* — Marcus Windrich
(74) *Attorney, Agent, or Firm* — Donna P. Suchy; Daniel M. Barbieri (57) ABSTRACT

Present novel and non-trivial systems and methods for generating aircraft height data are disclosed. A processor is configured to receive both first data comprised of radar-based reflection data of a stationary reference point based upon a horizontal distance between the geographic position of an aircraft and the geographic position of the stationary reference point (e.g., landing threshold point) and second data comprised of internally sourced vertical travel data more frequently than the first data. From the first data and second data, an instant vertical distance above the stationary reference point is determined by updating the first data with the second data. Then, instant height data representative of the instant vertical distance above the stationary reference point is generated. Provided with the instant height data, a presentation system comprised of display unit, aural alert unit and/or a tactile alert unit may present the instant vertical distance to the pilot.

22 Claims, 5 Drawing Sheets

SYSTEMS AND METHODS FOR GENERATING AIRCRAFT HEIGHT DATA AND EMPLOYING SUCH HEIGHT DATA TO VALIDATE ALTITUDE DATA

BACKGROUND OF THE INVENTION

1. Field of the Invention

This invention pertains generally to the field of aircraft altimeter systems.

2. Description of the Related Art

A radio altimeter, commonly referred to as a radar altimeter, is a system used for accurately measuring and displaying the height above terrain directly beneath an aircraft. A typical system could be comprised of a receiver-transmitter unit, antenna(s) for transmitting a signal to the terrain and receiving of such signal reflected by the terrain, and an indicator. In some precision approach procedures known to those skilled in the art (for example, Cat II and Cat III precision approach procedures of an instrument landing system ("ILS")), the use of a radar altimeter system may be required for specifying the exact minimum height above the terrain known as decision height ("DH"). The DH may be considered as a specified altitude in a precision approach procedure, charted as a height above an elevation of a landing threshold point ("LTP"), at which a decision must be made either to continue the approach or to execute a missed approach procedure.

When an aircraft is approaching a runway, the radar altimeter is not able to provide instant height above the LTP ("HATh") information because the LTP is not beneath the aircraft. Although instant HATh information may be determined by using altitude information provided by a navigation system of the aircraft and elevation information provided by a reference point data source (e.g., a database of a flight management system), errors may exist with the altitude information provided by the navigation system.

For example, altitude information provided by a satellite navigation system ("Sat Nav") may lack the navigation performance accuracy that is required by "Required Navigation Performance" ("RNP") standards that have been published to establish navigation performance accuracy necessary for operation within a defined airspace. Although the information provided by the Sat Nav may lack navigation performance accuracy required by RNP standards, the geographic information (i.e., latitude and longitude information) provided by the Sat Nav may nevertheless be useful in determining the instant HATh when an airborne radar system is employed. Radar-based reflection data corresponding to the horizontal distance between the geographic position of the aircraft and the geographic position of the LTP provided by a reference point data source may be used to provide instant HATh information. Although an airborne radar system may provide such instant HATh information, such information is typically limited to a periodic calculation at a relatively slow rate because the antenna of an airborne radar system typically scans a full scene outside of the aircraft continuously and repeatedly and not a singular point. For example, the antenna of a weather radar system may be dedicated to providing weather information by scanning the full scene in front of the aircraft. As such, instant HATh information based upon radar reflection data may be useful for a very short period of time.

BRIEF SUMMARY OF THE INVENTION

The embodiments disclosed herein present novel and non-trivial systems and methods for generating height data using radar-based reflection data and vertical travel data, where the vertical travel data is received at a faster rate than the reflection data and used to update the instant height data in between each period in which the reflection data is received. Moreover, the height data that has been generated may be used to independently validate altitude data of one or more navigation data source.

In one embodiment, a system is disclosed for generating aircraft height data. The system is comprised of a source of first data comprised of radar-based reflection data, at least one source of second data comprised of navigation data, and a processor configured to receive the first data and the second data, where the second data is received at a faster rate than the first data. After receiving the data, the processor determines an instant vertical distance above a stationary reference point such as a landing threshold point ("LTP") and generates instant height data representative of such instant vertical distance. As embodied herein, the radar-based reflection data corresponds to the reflection(s) at the LTP based upon a horizontal distance between the geographic positions of an aircraft and the stationary reference point. The navigation data corresponds to internally-sourced vertical travel data. The instant vertical distance is determined by updating the first data with the second data in between each period in which the first data is received. Additionally, the internally-sourced vertical travel data may be comprised of blended vertical travel data.

The system for generating aircraft height data may be further comprised of a presentation system comprised of a display unit, an aural alert unit, and/or a tactile alert unit, where the presentation system presents the instant vertical distance represented in the instant height data to one or more of such unit(s). Also, the system for generating aircraft height data may be further comprised of a source of reference point data from which the processor is configured to receive the reference point data of the LTP along with first altitude data from the navigation system representative of an aircraft's altitude. Then, the processor determines second altitude data from the instant height data and the reference point data, determines the validity of the first altitude data with the second altitude data, and generates validity advisory data representative of validity information in response to the validity determination. As embodied herein, the first altitude data is determined to be valid as a function of a defined tolerance limit.

In another embodiment, a system is disclosed for employing aircraft height data to validate aircraft altitude data. The system is comprised of a source of instant height data comprised of data representative of an instant vertical distance above the LTP, a source of navigation data comprised of first altitude data representative of a first altitude of the aircraft, a source of reference point data comprised of elevation data representative of the elevation of the LTP, and a processor configured to receive the instant height data, the navigation data, and the reference point data. After receiving the data, the processor determines second altitude data representative of a second altitude of the aircraft as a function of the instant height data and the elevation data, determines the validity of the first altitude data, and generates validity advisory data responsive to the validity determination, whereby the validity advisory data is representative of validity information. As embodied herein, the instant height data is based upon radar-based reflection data that is updated by vertical travel data.

The system for employing aircraft height data to validate aircraft altitude data may be further comprised of a presentation system comprised of a display unit, an aural alert unit, and/or a tactile alert unit, where the presentation system presents the validity information represented in the validity advisory data to a display unit, an aural alert unit, and/or a tactile alert unit.

In another embodiment, a method is disclosed for generating aircraft height data. The method is comprised of receiving first data comprised of radar-based reflection data of a stationary reference point, receiving second data comprised of internally-sourced vertical travel data at a faster rate than the first data, determining an instant vertical distance above the LTP by updating the first data with the second data in between each period in which the first data is received, and generating instant height data representative of the instant vertical distance above the LTP.

The method may be further comprised of blending the internally-sourced vertical travel data if the internally-sourced vertical travel data is received from at least two sources of navigation data. Also, the method may be further comprised of providing the instant height data to a presentation system, whereby the instant vertical distance is presented visually on the screen of a display unit, aurally through an aural alert unit, and/or tactilely through a tactile alert unit. Also, the method may be further comprised of receiving navigation data comprised of first altitude data representative of the aircraft's altitude, determining second altitude data from the instant height data and the reference point data, determining the validity of the first altitude data with the second altitude data, and generating validity advisory data representative of validity information in response to the validity determination.

In another embodiment, a method is disclosed for employing aircraft height data to validate aircraft altitude data. The method is comprised of receiving instant height data representative of an instant vertical distance above the LTP, receiving first altitude data representative of a first altitude of the aircraft, receiving reference point data representative of the elevation of the LTP, determining second altitude data representative of a second altitude of the aircraft as a function of the instant height data and the elevation data, determining the validity of the first altitude data, and generating validity advisory data responsive to the validity determination, whereby the validity advisory data is representative of validity information. As embodied herein, the instant height data is based upon radar-based reflection data that is updated by vertical travel data.

BRIEF DESCRIPTION OF THE DRAWINGS

The drawings of FIG. 1 depict a combined functional block diagram of systems for generating height data and using such height data in the verification of altitude data.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
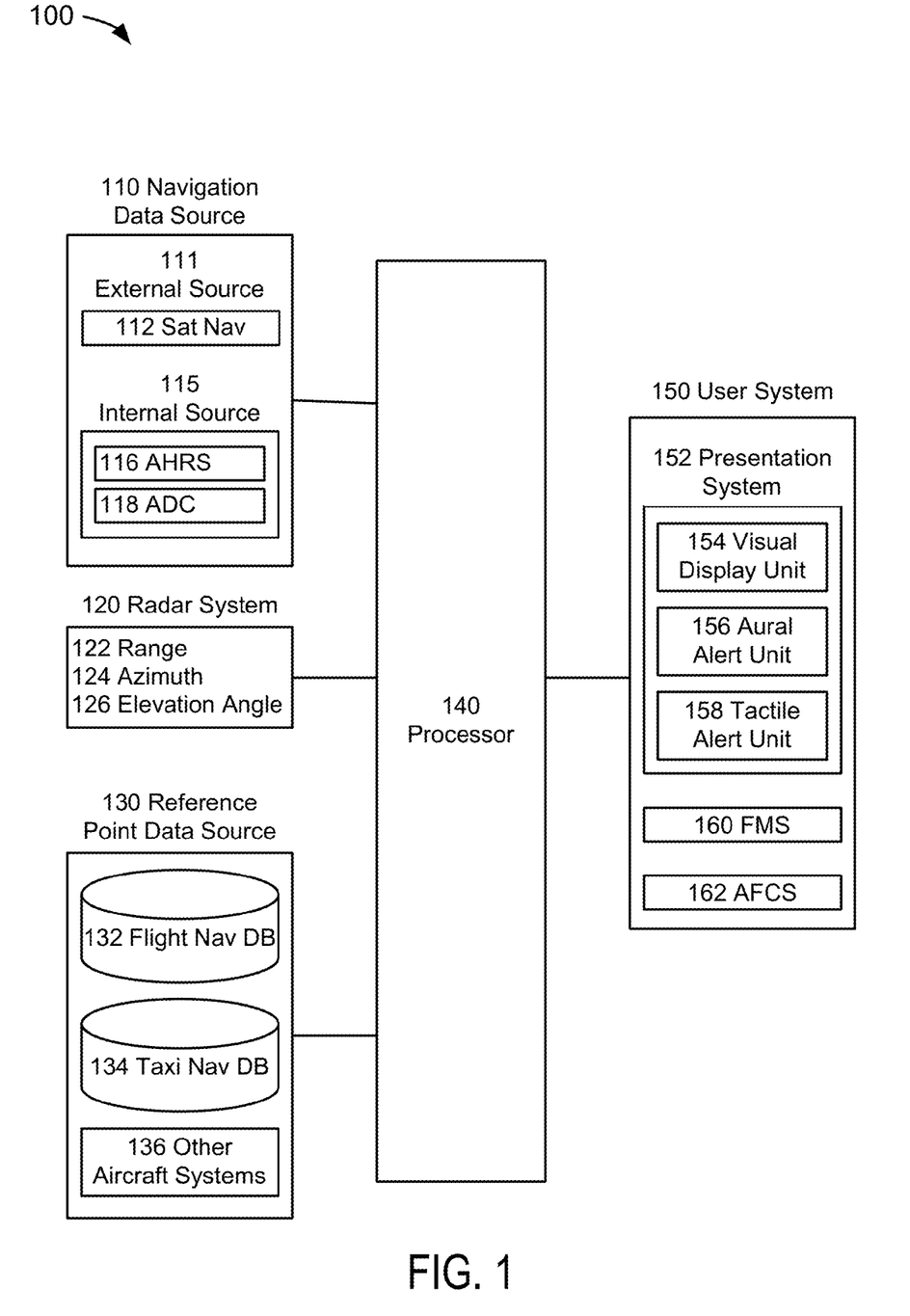

FIG. 1 depicts a functional block diagram of an aircraft height data generation and validation system 100 suitable for implementation of the techniques described herein. The functional blocks of the system may include a navigation data source 110, an aircraft radar system 120, a reference point data source 130, a processor 140, and a user system 150.

In an embodiment of FIG. 1, the navigation data source 110 may be comprised of one or more systems for acquiring and providing navigation data to any aircraft system requiring an input of navigation data. As embodied herein, data could be comprised of any analog or digital signal, either discrete or continuous, which could contain information. As embodied herein, signals are synonymous with data. In addition, aircraft could mean any manned or unmanned vehicle which is able to fly through the air, atmosphere, and/or space including, but not limited to, lighter than air vehicles and heavier than air vehicles, wherein the latter may include fixed-wing and rotary-wing vehicles. Additionally, aircraft could be watercraft capable of operating on or beneath water.

The navigation data source 110 could be comprised of, but not limited to, an external source 111 and/or an internal source 115. The external source 111 may refer to a data source which acquires raw data from a source external to the aircraft, and the internal source 115 may refer to a data source which acquires raw data from a source internal to the aircraft. For both types of sources, the raw data could be data from which navigation data may be determined.

An example of an externally-sourced navigation data source 111 is a satellite navigation system ("Sat Nav") 112. From the external source 111, navigation data such as aircraft position data comprised of geographic position (e.g., latitude and longitude coordinates) data and altitude data may be determined and provided as output. In addition, data representative of the quality of the navigation data may be provided by the navigation data source 110, where such data may include parameters associated with, but not limited to, accuracy, resolution, integrity, uncertainty, and/or validity.

The quality of navigation data provided by the Sat Nav 112 could depend on other considerations such as whether an augmentation system is employed to augment satellite signals. A Satellite-Based Augmentation System ("SBAS") such as the wide area augmentation system ("WAAS") employed by the United States Federal Aviation Administration ("FAA") may deliver an increase of quality of data through such parameters as accuracy, availability, and integrity; a WAAS broadcast message may improve signal accuracy from 100 meters to approximately 7 meters. A Ground-Based Augmentation System ("GBAS") such as the local area augmentation system ("LAAS") employed by the FM may deliver better quality of data than a WAAS by providing extremely high parameters of accuracy, availability, and integrity; for example, a LAAS has demonstrated an accuracy of less than 1 meter in both the horizontal and vertical axes.

Examples of an internally-sourced navigation data source 115 could include, but not be limited to, an attitude heading reference system ("AHRS") 116 and/or an air/data system ("ADS") 118. As embodied herein, the AHRS 116 could be any system in which navigation data is derived from inertial sensors such as accelerometers for measuring motion on the axes of an aircraft and/or gyroscopes for measuring rotation about the axes. Known to those skilled in the art and depending on the specific configuration, the AHRS 116 could provide output data representative of heading, pitch, roll, body rate and accelerations, and/or vertical velocity, where vertical velocity data may be considered vertical travel data. As disclosed herein, data which may be used to measure vertical movements may be considered vertical travel data.

As embodied herein, the air/data system ("ADS") 118 could be any system in which navigation data is derived from an aircraft's pitot-static system. Known to those skilled in the art, the ADS 118 could provide output data representative of barometric altitude, corrected barometric altitude, altitude trend, computed airspeed, true airspeed, mach number, static air temperature, and/or total air temperature. As disclosed herein, barometric altitude, corrected barometric altitude, and/or altitude trend may be considered vertical travel data. As embodied herein, the navigation data source 110 could provide navigation data to the processor 140 for subsequent processing as discussed in detail below.

In an embodiment of FIG. 1, the aircraft radar system 120 could comprise any aircraft radar system installed in an aircraft which provides range data corresponding to one or more reference points located outside of the aircraft. The aircraft radar system 120 is well-known to those skilled in the art. A common example of the aircraft radar system 120 is a forward-looking aircraft weather radar system. The aircraft radar system 120 may be comprised of, in part, a transceiver and antenna. A transceiver may transmit electromagnetic waves into the atmosphere via an antenna which, in turn, produces a focused beam. The transceiver may control the direction of the beam by steering the antenna horizontally and vertically.

When the waves strike or reflect off an object such as terrain or a runway surface, part of the energy in the waves is reflected back and received by the antenna. The range 122 of the object may be determined by the transceiver by measuring the elapsed time between the transmission and reception of the signal. The azimuth 124 of the object may be determined as the angle to which the antenna was steered in the horizontal direction relative to the longitudinal axis of the aircraft during the transmission/reception of the signal. The elevation or elevation angle 126 of the object may be determined as the angle to which the antenna was steered in the vertical direction relative to the longitudinal axis of the aircraft during the transmission/reception of the signal. As embodied herein, a forward-looking aircraft radar system 120 could acquire terrain data including, but not limited to, range 122, azimuth 124, and elevation angle 126.

The advantages and benefits of the embodiments disclosed herein may be illustrated by showing how the aircraft radar system 120 may be used in the generation of height data by determining a measurement of vertical distance above a stationary reference. Referring to the drawings of FIG. 2, a forward-looking aircraft radar system is installed in aircraft 202 flying towards a runway 204. As indicated by the transmitted signal 206 in FIG. 2A, the radar system has transmitted a signal via an antenna to a reference point 208 of which the geographic position is known, where the transmitted signal has been directed downward at an angle of elevation 210 and azimuth (not shown) with respect to a reference axis (which is assumed to coincide with the longitudinal axis of the aircraft 202).

Figure 2A:
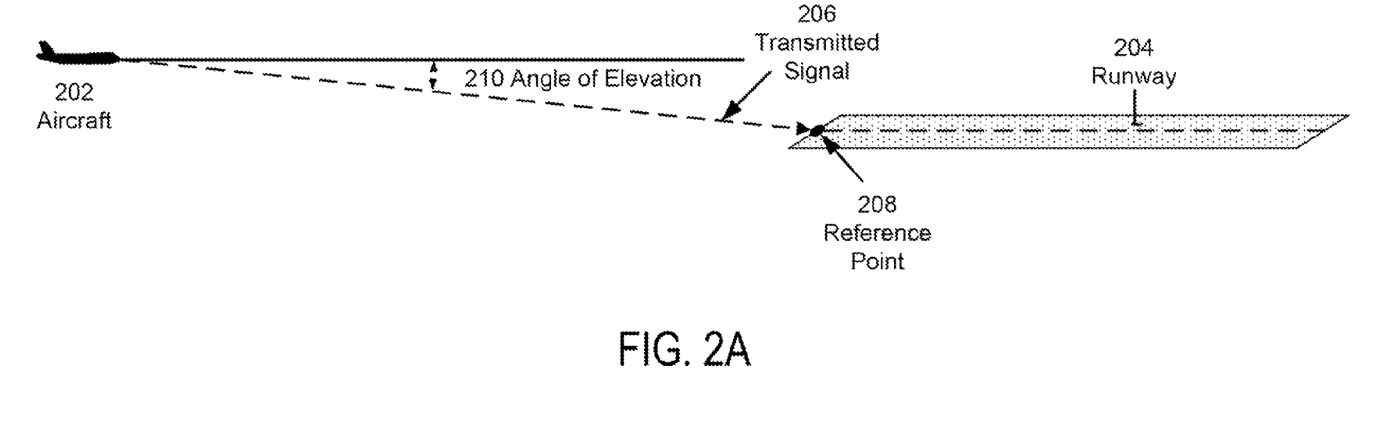
FIG. 2A depicts the transmission of a signal by a forward-looking radar system.
Figure 2B:
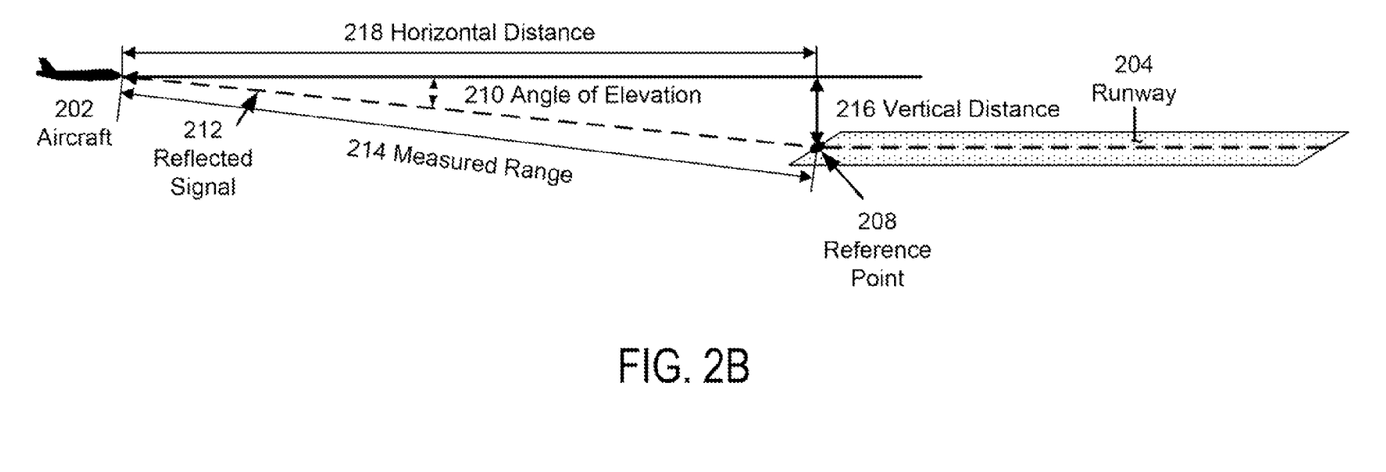
FIG. 2B depicts the reflection of a signal transmitted by a forward-looking radar system.

When a signal strikes or reflects off the reference point 208 as shown in FIG. 2B, part of the energy in the signal is reflected back as indicated by the reflected signal 212. When the reflected signal 212 is received by the antenna, a measured range 214 may be determined. Knowing the angle of elevation 210 and azimuth from which the measured range 214 is determined, the horizontal distance 218 may be determined. When the horizontal distance 218 equals the instant horizontal distance determined from the difference between the geographic position of the aircraft 202 (provided from the navigation data source 110) and the geographic position of the reference point 208 (provided by the reference point data source 130 as discussed below), then the instant vertical distance 216 above of the reference point 208 (i.e., the instant height of the aircraft 202 above the reference point 208) may be determined. It should be noted that multiple iterations or measurements may be needed before the combination of measured range 214, angle of elevation 210, and azimuth produces the horizontal distance 218 that corresponds to the instant horizontal distance between the aircraft 202 and the reference point 208.

It should be noted that the reference point 208 coincides with a landing threshold point ("LIP") of the runway 204 in the drawings of FIG. 2. Generally, the LTP of a runway may be the point where the runway centerline intersects the runway threshold of a runway, where the LTP has a defined geographic position and/or elevation. Data representative of the geographic position and/or elevation of the LTP may be stored in the reference point data source 130. Although the reference points in the following discussion may be drawn to LTPs, the disclosures herein are not limited to LTPs but may include any point having a defined geographic position and/or elevation.

As discussed above, the quality of navigation data provided by the navigation data source 110 may depend upon one or more quality parameters such as, but not limited to, accuracy, resolution, integrity, uncertainty, and/or validity. Due to the quality of navigation data, there could be a difference between the aircraft position information represented in the navigation data and the actual position of the aircraft. For example, aircraft geographic position information provided by the Sat Nav 112 may agree with the aircraft geographic position but altitude information provided by the Sat Nav 112 may not agree with the actual altitude of the aircraft because of poor quality of altitude data. In such instances, the aircraft radar system 120 may be used to generate altitude data which in turn, may be used to verify other source(s) of altitude data; this was disclosed by Bell et al in U.S. Pat. No. 8,410,975 entitled "Systems and Methods for Generating and Verifying Altitude Data," which is incorporated by reference in its entirety.

Because the quality of altitude information provided by the navigation data source 110 may not be suitable for one or more specific flight operations, it may not be a suitable source of altitude data for deriving other information such as height above [landing] threshold ("HATh") information, where HATh may be derived by subtracting elevation of the LTP (provided by the reference point data source 130) from aircraft altitude.

Although the quality of altitude information may not be suitable for one or more specific flight operations, the quality of aircraft geographic position provided by the Sat Nav 112 may nevertheless be suitable. From the discussion above, a determination of instant horizontal distance between the geographic position of the aircraft and the geographic position of an LTP may be used in finding the combination of measured range, angle of elevation, and azimuth that produces the same horizontal distance and from which an instant HATh may be determined.

Although aircraft geographical information may be a basis for determining a HATh with the aircraft radar system 120, the scan of such system may not allow a "continuous" scan the LTP as the aircraft approaches the runway. For example, the aircraft radar system 120 may be able to scan the LTP once every 5 seconds only. Because of this "long" interval between scans, the instant HATh information determined from the combination of measured range, angle of elevation, and azimuth may be correct at the time the measurements are made only. To compensate for the absence of HATh information during scan intervals, vertical travel data provided by the navigation data source 110 may be used to fill in the gaps and update the radar-based HATh information as disclosed below. Depending on the navigation data source 110, vertical travel data could be provided at a much faster rate relative to the scan of the aircraft radar system 120. For example, an AHRS 116 and an ADS 118 produced by Rockwell Collins, Inc. provide vertical travel data at rates of 50 Hz and 20 Hz, respectively. As embodied herein, the aircraft radar system 120 could provide radar-based reflection data of a stationary reference point to the processor 140 for subsequent processing as discussed in detail below.

Returning to FIG. 1, the reference point data source 130 could comprise any source of reference point data. The reference data source 130 may include, but is not limited to, a flight navigation database 132 that may be part of a flight management system, a taxi navigation database 134, and other aircraft systems 136: It should be noted that data contained in any database discussed herein may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Any database used in the embodiments disclosed herein may be a stand-alone database or a combination of databases.

The flight navigation database 132 may contain records which provide reference data such as, but not limited to, runway data such as LTPs, airport data, and/or approach data. The flight navigation database 132 could contain data associated with ground-based navigational aids, waypoints, holding patterns, airways, airports, heliports, instrument departure procedures, instrument arrival procedures, instrument approach procedures, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, path point records, and GNSS Landing Systems. Such flight navigation database 132 could be provided by an aircraft system such as, but not limited to, a flight management system ("FMS").

The taxi navigation database 134 may be used to store airport data that may be representative of, in part, airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs.

The taxi navigation database 134 could comprise an aerodrome mapping database ("AMDB") as described in the following document published by RTCA, Incorporated: RTCA DO-272A entitled "User Requirements for Aerodrome Mapping Information." DO-272A provides for aerodrome surface mapping requirements for aeronautical uses particularly onboard aircraft. Those skilled in the art appreciate that these standards may be changed with future amendments or revisions, that additional content may be incorporated in future revisions, and/or that other standards related to the subject matter may be adopted. The embodiments disclosed herein are flexible enough to include such future changes and/or adoptions without affecting the content and/or structure of an AMDB.

Other aircraft systems 136 could include a source of reference data and are included herein as a source of reference point data. As embodied herein, the reference point data source 130 could provide reference point data to the processor 140 for subsequent processing as discussed herein.

In an embodiment of FIG. 1, the processor 140 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The processor 140 may be driven by the execution of software or computer instruction code containing algorithms developed for the specific functions embodied herein. The processor 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the processor 140 could be a processor(s) used by or in conjunction with any other system of the aircraft including, but not limited to, the navigation data source 110, the aircraft radar system 120, the reference point data source 130, and the user system 150, or any combination thereof.

The processor 140 may be programmed or configured to receive as input data representative of information obtained from various systems and/or sources including, but not limited to, the navigation data source 110, the aircraft radar system 120, and the reference point data source 130. As embodied herein, the terms "programmed" and "configured" are synonymous. The processor 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The processor 140 may be programmed or configured to execute one or both of the methods discussed in detail below. The processor 140 may be programmed or configured to provide output data to various systems and/or units including, but not limited to, the user system 150.

In an embodiment of FIG. 1, the user system 150 could be comprised of any system that may use instant height data of instant vertical distance above the stationary reference point such as HATh. Examples of the user system 150 include, but are not limited to, a presentation system 152 and a flight management and guidance system ("FMGS") 160. The user system 150 could also include the navigation data source 110 and/or the aircraft radar system 120.

The presentation system could be comprised of a visual display unit 154, an aural alerting unit 156, and/or a tactile alerting unit 158 for presenting the pilot with HATh information and/or altitude validity information. As embodied herein, the visual display unit 154 may include a vision system (not shown) which generates an image data set which represents the image displayed on a display unit. Vision systems could include, but are not limited to, a synthetic vision system ("SVS"), an enhanced vision system ("EVS"), and/or a combined SVS-EVS. The visual display unit 154 could be a Head-Down Display ("HDD") unit and/or a Head-Up Display ("HUD") unit. An HDD unit is typically a unit for providing flight information to the pilot that is mounted to an aircraft's flight instrument panel located in front of a pilot and below the windshield and the pilot's external field of vision. A HUD unit is mounted in front of the pilot at windshield level and is directly in the pilot's external field of vision. The HUD system is advantageous because the display is transparent allowing the pilot to keep his or her eyes "outside the cockpit" while the display unit provides flight information to the pilot.

Figure 3A:
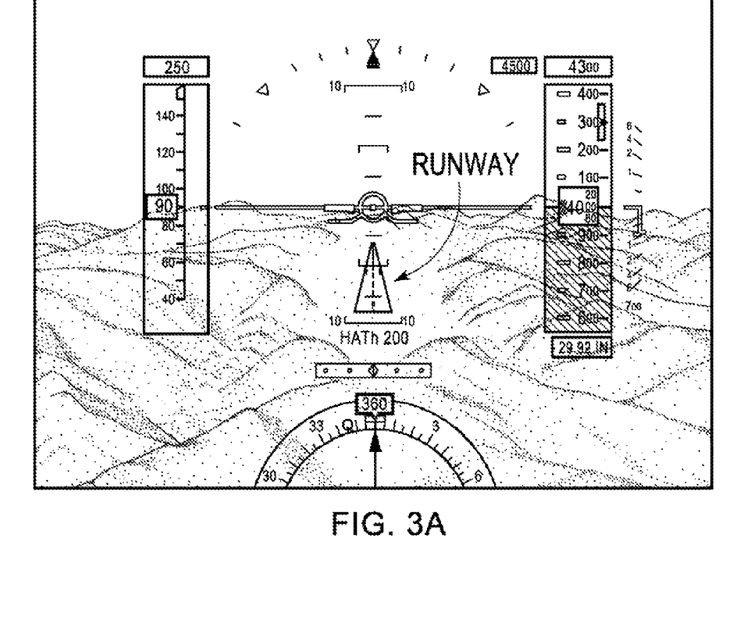
FIG. 3A depicts an exemplary illustration of an image on an HDD display unit depicting a scene outside the aircraft with symbology providing flight information including height above threshold ("HATh") information.

FIG. 3A provides an exemplary depiction of an HDD unit for presenting information to the pilot or flight crew against the background of a three-dimensional image of terrain and sky; the HDD unit could be employed as a display unit in an SVS, an EVS, or a combined SVS-EVS. It should be noted that the information depicted on the HDD unit has been minimized for the sake of presentation and is not indicative of the plurality of indications or information with which it may be configured.

Figure 3B:
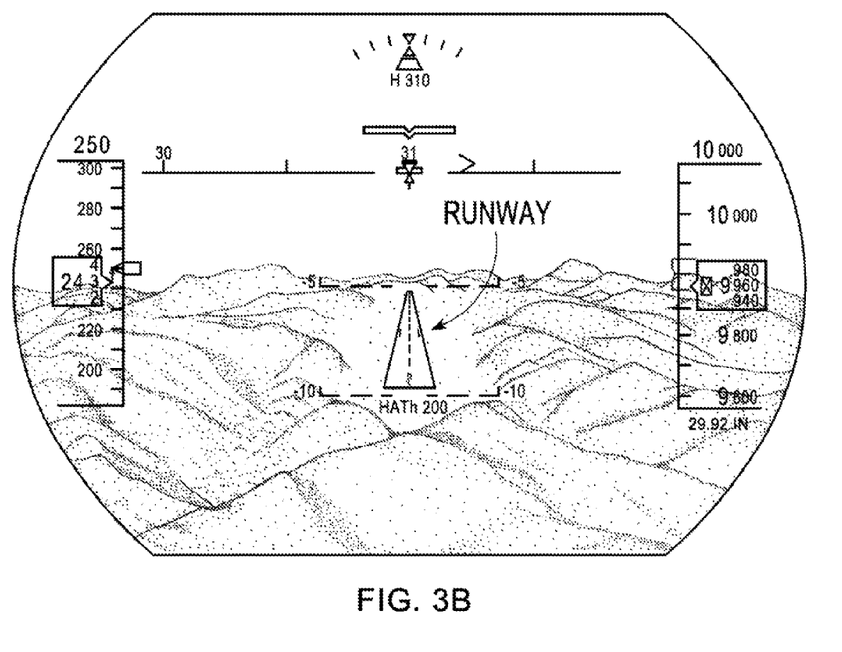
FIG. 3B depicts an exemplary illustration of an image on a HUD display unit depicting a scene outside the aircraft with symbology providing flight information including HATh information.

Because the indications or information shown in the drawings of FIG. 3 are well-known to those skilled in the art, a discussion of the specific information shown is not provided herein; however, as shown below the runways depicted in the drawings of FIG. 3, information comprised of "HATh 200" (indicating that the aircraft is at a height above the threshold of 200 feet) is presented.

FIG. 3B provides an exemplary depiction of a HUD unit for presenting information to the pilot or flight crew against the background of a three-dimensional image of terrain and sky; a HUD unit could be employed as display unit in an SVS, an EVS, or a combined SVS-EVS. It should be noted that the information depicted on the HUD unit has been made minimal for the sake of presentation and is not indicative of the plurality of indications or information with which it may be configured.

As shown in the drawings of FIG. 3, the visual display unit 154 could be capable of presenting HATh information. In addition, validity information regarding altitude information may be presented by displaying or projecting such validity information on the screen of the visual display unit 154. Validity information may include alerts and/or non-alert(s). Alerts may be based on level of threat or conditions requiring immediate crew awareness. Caution alerts may be alerts requiring immediate crew awareness and subsequent flight crew response. Warning alerts may be alerts requiring immediate flight crew action. As embodied herein, both caution and warning alerts may be presented in combination with or simultaneous to aural alerts and/or tactile alerts. Alerts may be presented visually by depicting one or more colors that may be presented on a display unit indicating one or more levels of threat. For the purpose of illustration and not limitation, amber or yellow may indicate a caution alert, and red may indicate a warning alert; green, white, or cyan may indicate information that is not an alert.

In one embodiment, visual alerts could be presented in a textual form including text messages such as a red "CHK FAIL" when the conditions for a warning alert have been met. In another embodiment, visual alerts could be presented in a non-textual form such as a symbol. In another embodiment, textual and non-textual forms could remain steady or flash intermittently, where the speed of such flashing could depend on the distance to a runway.

It should be noted that the disclosure herein will discuss visual alerts, which present a textual form with a plurality of words included. As used herein, the words should be construed as generic words for advisory information provided to the pilot and not words which limit the presentation to the recipient. For the purpose of illustration and not limitation, a non-exhaustive list of words that may be used (where such words may depend on the conditions experienced by an aircraft either on the ground or in flight) could include, but are limited to, "CHK FAIL" or "NOT VALID" when a determination of validity is not favorable, "HATh MON" or "VALID" when a determination of validity is favorable, or "HATh CHK" or "VALID TBD" when waiting for the result of a validity determination.

The aural alerting unit 156 may be any unit capable of producing aural alerts. Aural alerts may be discrete sounds, tones, and/or verbal statements used to annunciate a condition, situation, or event. In one embodiment, an aural alert could call out "WARNING—HEIGHT ABOVE THRESHOLD VALIDITY NOT CONFIRMED" when the conditions for a warning alert have been met, a tonal indicator could be provided, or both. As embodied herein, warning and caution aural alerts could be presented in combination with or simultaneous to visual alerts and/or tactile alerts.

The tactile alerting unit 158 may be any unit capable of producing tactile alerts. Tactile alerts may be any tactile stimulus to present a condition, situation, or event to the pilot. As embodied herein, tactile alerts could be presented in combination with or simultaneous to visual alerts and/or aural alerts.

In an embodiment of FIG. 1, the FMGS 160 may be any system that provides one or more of the following functions: autopilot, flight direction, auto throttle, and/or flight management. One of the procedures that could be performed by the FMGS 160 could include the automated operation of the aircraft during an instrument approach procedure to a runway of intended landing. As part of the procedure, the aircraft may reach a decision height (which may be expressed as HATh) at which time the pilot may be required to make a decision to continue the approach to landing or begin a "missed approach" procedure. The FMGS 160 is known to those skilled in the art.

The advantages and benefits of the embodiments disclosed herein may be illustrated by showing an example of how the height data representative of instant HATh information determined from radar-based reflection data of a stationary reference point and how such height data may be used to cross-check altitude data to determine the Validity of altitude information. In this example, assume that an instant HATh of 200 feet has been determined from reference point reflection data of the aircraft radar system 120. Also, assume that a first aircraft altitude of 905 feet has been provided by the navigation data source 110. If the elevation of the LTP provided by the reference point data source 130 is assumed to be 700 mean seal level ("MSL") for this example, then a second aircraft altitude of 900 feet may be determined by adding the instant HATh to the elevation of the LTP.

Here, there is a difference of 5 feet between the first aircraft altitude and the second aircraft altitude; despite the inequality, however, the first aircraft altitude may nevertheless be valid if a tolerance limit is employed. For example, if a tolerance limit between the two values of aircraft altitude has been defined as +/−6 feet, then the first aircraft altitude may be determined to be valid because the actual difference of 5 feet falls within the defined tolerance limit; on the other hand, if the tolerance limit has been defined as +/−4 feet, then the first aircraft altitude may be determined to be not valid because the actual difference of 5 feet falls outside of the defined tolerance limit.

Figure 4:
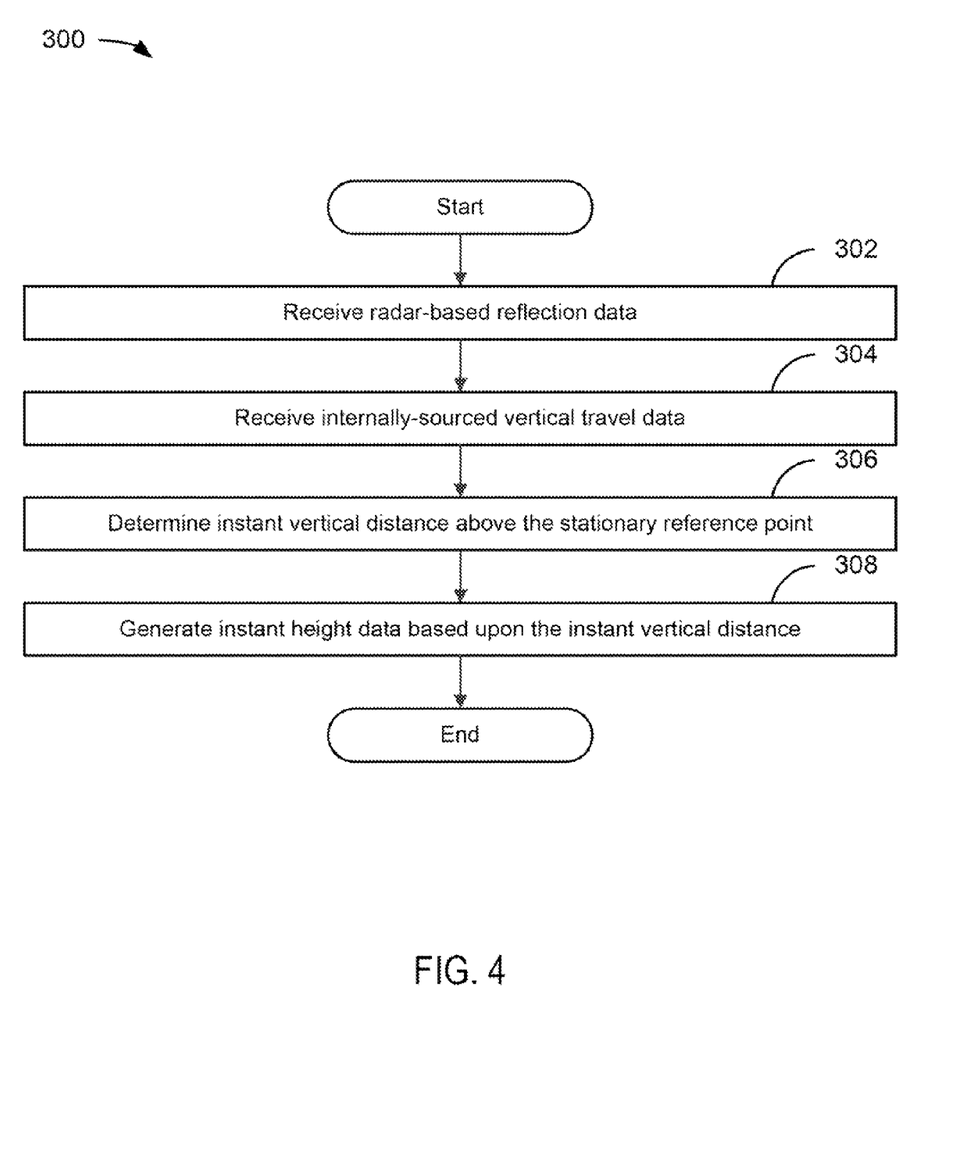
FIG. 4 depicts a flowchart of a method for generating height data.
Figure 5:
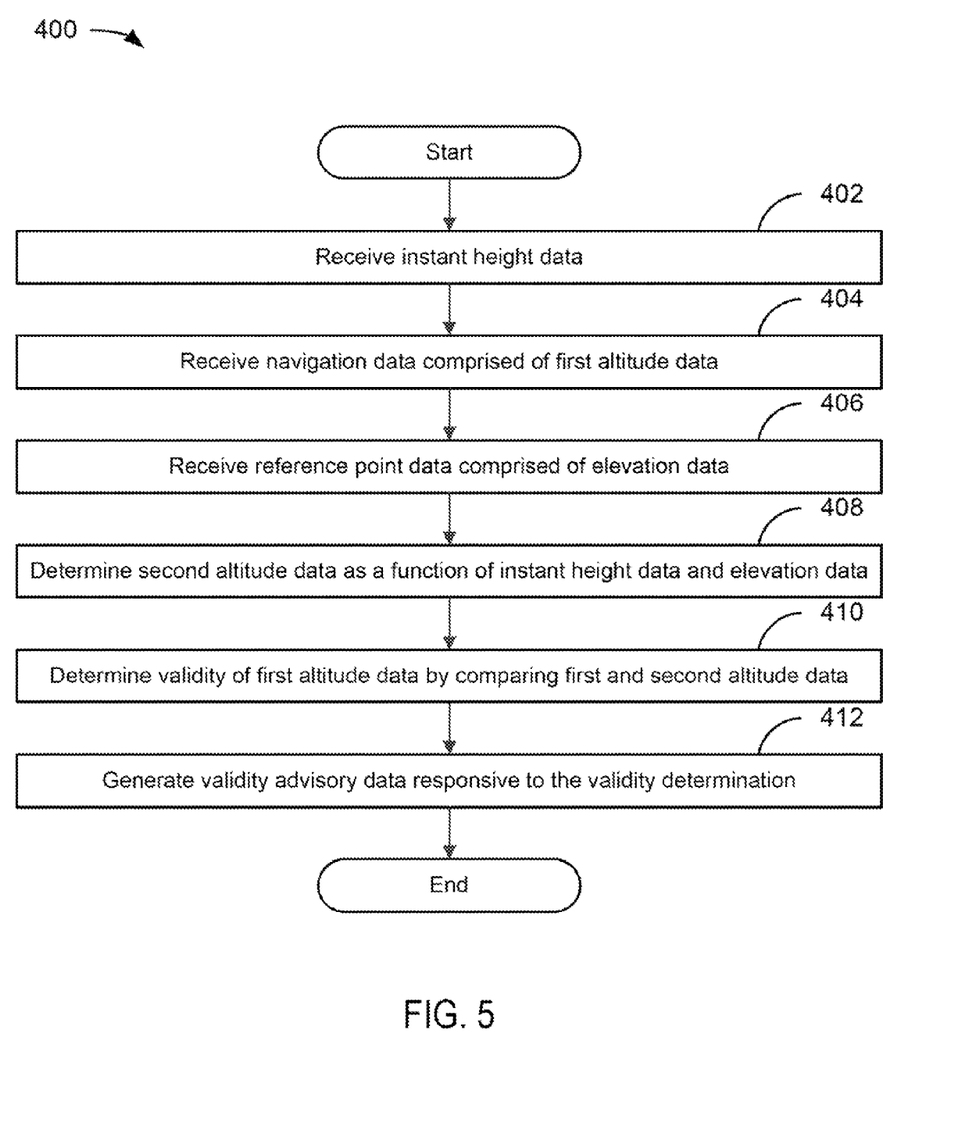
FIG. 5 depicts a flowchart of a method for using height data in the verification of altitude data.

FIG. 5 depicts flowchart 300 disclosing an example of a method for generating aircraft height data, and FIG. 6 depicts flowchart 400 disclosing an example of a method for employing such aircraft height data to verify aircraft altitude data, where the processor 140 may be programmed or configured with instructions corresponding to the following modules embodied in flowcharts 300 and 400. As embodied herein, the processor 140 may be a processor or a combination of processors found in the navigation data source 110, the aircraft radar system 120, the reference point data source 130, the processor 140, and/or the user system 150. Also, the processor 140 may be a processor of a module such as, but not limited to, a printed circuit card having one or more input interfaces to facilitate the two-way data communications of the processor 140, i.e., the receiving and providing of data. As necessary for the accomplishment of the following modules embodied in flowcharts 300 and 400, the receiving of data is synonymous and/or interchangeable with the retrieving of data, and the providing of data is synonymous and/or interchangeable with the making available or supplying of data.

As shown in FIG. 4, the flowchart 300 is depicted. The flowchart begins with module 302 with the receiving of radar-based reflection data of a stationary reference point, where such reflection data is received or sampled at a first rate. Such reflection data may be based upon a horizontal distance between the geographic position of an aircraft and the geographic position of the stationary reference point, where the stationary reference point could be an LTP. In one embodiment, such reflection data may be data representative of a vertical distance of the aircraft above the reference point as determined by the aircraft radar system 120; the aircraft radar system 120 could have determined the vertical distance as a function of the measured range and elevation angle to the reference point, where the horizontal distance corresponding to the measured range and the elevation angle equals the horizontal distance between the geographic positions of the reference point and the aircraft. In another embodiment, such reflection data may be data representative of the measured range and the elevation angle to the reference point as generated by the aircraft radar system 120; if so, the processor 140 could determine the vertical distance as a function of a range and an elevation angle to the reference point.

The flowchart continues with module 304 with the receiving of internally-sourced vertical travel data from one or more internal sources 115, where such travel data may be received or sampled at a second rate that is faster than the first rate. As embodied herein, vertical travel data may be comprised of any data from which vertical travel may be determined over a period of time. In one example, vertical velocity data received from the AHRS 116 may be continuously integrated to determine vertical travel of the aircraft during the interval in which the reflection data is received. In another example, a change in altitude may be continuously measured from altitude data received from the ADS 118 to determine vertical travel of the aircraft during such interval.

In an additional embodiment, the vertical travel data that is received could be comprised of blended vertical travel data, where vertical travel data from two or more internal sources 115 have been blended together prior to being received. In another embodiment, the vertical travel data could be comprised of vertical travel data received from two or more internal sources 115 that are blended together after being received. The use of blending algorithm(s) (e.g., a Kalman filter) is known to those skilled in the art.

The flowchart continues with module 306 with the determination of instant vertical distance above the stationary reference point, where such determination is made by updating the radar-based reflection data with the internally-sourced vertical travel data in between each period in which the radar-based reflection data is received. The flowchart continues with module 308 with the generation of instant height data, where such instant height data is representative of the instant vertical distance above the stationary reference point.

In an additional embodiment, the instant height data may be provided to at least one user system such as the presentation system 152 configured to receive the instant height data. If so, the instant vertical distance above the stationary reference point represented in the instant height data may be presented to the pilot. If the instant height data corresponds to visual data, then the vertical distance may be presented to the pilot on the screen of visual display unit 154. If the instant height data corresponds to aural data, then the vertical distance may be presented to the pilot via an aural alerting unit 156. If the instant height data corresponds to tactile data, then the vertical distance may be presented to the pilot via a tactile alerting unit 158.

In another embodiment, navigation data comprised of first altitude data representative of a first altitude of the aircraft may be provided to the processor 140; if so, the first altitude of the aircraft may be subjected to a validity determination using the instant height data as disclosed in flowchart 400. Then, flowchart 300 proceeds to the end.

As shown in FIG. 5, the flowchart 400 is depicted. The flowchart begins with module 402 with the receiving of instant height data representative of an instant vertical distance above a stationary reference point. The instant height data may have been generated from radar-based reflection data and vertical travel data as disclosed in flowchart 300.

The flowchart continues with module 404 with the receiving of navigation data that may be provided by the navigation data source 110. As embodied herein, the navigation data may be comprised of first altitude data representative of a first altitude of the aircraft.

The flowchart continues with module 406 with the receiving of reference point data that may be provided by the reference point data source 130. As embodied herein, the reference point data may be comprised of elevation data representative of the elevation of the stationary reference point.

The flowchart continues with module 408 with the determining of second altitude data representative of a second altitude of the aircraft. As embodied herein, the second altitude data could be determined as a function of the instant height data and the reference point data. That is, the first altitude could be added to the elevation of the stationary reference point to determine the second altitude.

The flowchart continues with module 410 with the determining of the validity of the first altitude data by comparing the first altitude data with the second altitude data. As embodied herein, the validity of the second altitude data may be determined using a defined tolerance limit, where valid first altitude data may exist when the difference between the first aircraft altitude and the second aircraft altitude falls within the defined tolerance limit.

The flowchart continues with module 412 with the generating of validity advisory data representative in response to the validity determination, where the validity advisory data may be representative of validity information corresponding to the validity determination, and the validity information may be representative of visual information, aural information, tactile information, or any combination thereof as configured by a manufacturer and/or end-user. In one embodiment, the validity advisory data may be provided to the presentation system 152. If the second altitude data has been determined to be valid, then validity information indicative of the favorable determination may be presented to the pilot on the applicable presentation unit(s); likewise, if the second altitude data has been determined to be not valid, then validity information indicative of the unfavorable determination may be presented to the pilot on the applicable presentation unit(s). Then, flowchart 400 proceeds to the end.

It should be noted that the method steps described above may be embodied in computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating aircraft height data, such system comprising:
    a source of airborne radar-based reflection data;
    at least one source of navigation data; and
    a processor configured to
        receive at a first rate first data comprised of airborne radar-based reflection data of a conventional, stationary reference point, where
            the conventional, stationary reference point is defined by at least a known geographic position,
        receive at a second rate second data comprised of internally-sourced vertical travel data provided by at least one source of navigation data, where
            the second rate is greater than the first rate,
        determine an instant vertical distance above the conventional, stationary reference point by updating the first data with the second data in between each period in which the first data is received, and
        generate instant height data representative of the instant vertical distance above the conventional, stationary reference point.

2. The system of claim 1, wherein the conventional, stationary reference point is a landing threshold point of a runway.

3. The system of claim 1, wherein
    the airborne radar-based reflection data of the conventional, stationary reference point is representative of
        a measured vertical distance above the conventional, stationary reference point, where
            the measured vertical distance has been determined as a function of elevation angle and range measurements, or
        elevation angle and range measurements from which a measured vertical distance above the conventional, stationary reference point is determined by the processor.

4. The system of claim 1, wherein the internally-sourced vertical travel data is comprised of blended vertical travel data derived by subjecting vertical travel data from at least two sources of navigation data to a blending algorithm.

5. The system of claim 1, wherein
    the processor is further configured to
        blend the internally-sourced vertical travel data if the internally-sourced vertical travel data is received from at least two sources of navigation data.

6. The system of claim 1, further comprising:
    a presentation system configured to
        receive the instant height data, where
            the processor has been further configured to provide the instant height data to the presentation system, and
        present the instant vertical distance above the conventional, stationary reference point represented in the instant height data, whereby
            the instant vertical distance is presented
                visually on the screen of a display unit,
                aurally through an aural alert unit,
                tactilely through a tactile alert unit, or
                any combination thereof.

7. The system of claim 1, further comprising:
    a source of reference point data, such that
        the processor is further configured to
            receive navigation data comprised of first altitude data representative of a first altitude of the aircraft,
            receive reference point data comprised of elevation data representative of the elevation of the conventional, stationary reference point,
            determine second altitude data representative of a second altitude of the aircraft as a function of the instant height data and the elevation data,
            determine a validity of the first altitude data by comparing the first altitude data with the second altitude data, and
            generate validity advisory data responsive to the validity determination, where
                the validity advisory data is representative of validity information.

8. The system of claim 7, wherein
    the first altitude data is determined to be valid when
        a tolerance limit is employed and defined, and
        the difference between the first altitude data and the second altitude data is within the tolerance limit.

9. A system for employing aircraft height data to validate aircraft altitude data, such system comprising:
    a source of instant height data;
    a source of navigation data;
    a source of reference point data; and
    a processor configured to receive instant height data representative of an instant vertical distance above a conventional, stationary reference point, where
the conventional, stationary reference point is defined by at least a known geographic position, and
the instant height data is based upon airborne radar-based reflection data that is updated by vertical travel data,
receive navigation data comprised of first altitude data representative of a first altitude of the aircraft,
receive reference point data comprised of elevation data representative of the elevation of the conventional, stationary reference point,
determine second altitude data representative of a second altitude of the aircraft as a function of the instant height data and the elevation data,
determine a validity of the first altitude data by comparing the first altitude data with the second altitude data, and
generate validity advisory data responsive to the validity determination, where the validity advisory data is representative of validity information.

10. The system of claim 9, wherein
the first altitude data is determined to be valid when
a tolerance limit is employed and defined, and
the difference between the first altitude data and the second altitude data is within the tolerance limit.

11. The system of claim 9, further comprising:
a presentation system configured to
receive the validity advisory data from the processor, where
the processor has been further configured to provide the validity advisory data to the presentation system, and
present the validity information represented in the validity advisory data, whereby
such validity information is presented
visually on the screen of a display unit,
aurally through an aural alert unit,
tactilely through a tactile alert unit, or
any combination thereof.

12. A method for generating aircraft height data, such method comprising:
Performing the following elements, where such elements are performed by a processor:
receiving at a first rate first data comprised of airborne radar-based reflection data of a conventional, stationary reference point, where
the conventional, stationary reference point is defined by at least a known geographic position;
receiving at a second rate second data comprised of internally-sourced vertical travel data provided by at least one source of navigation data, where
the second rate is greater than the first rate;
determining an instant vertical distance above the conventional, stationary reference point by updating the first data with the second data in between each period in which the first data is received; and
generating instant height data representative of the instant vertical distance above the conventional, stationary reference point.

13. The method of claim 12, wherein the conventional, stationary reference point is a landing threshold point of a runway.

14. The method of claim 12, wherein
the airborne radar-based reflection data of the conventional, stationary reference point is representative of
a measured vertical distance above the conventional, stationary reference point, where
the measured vertical distance has been determined as a function of elevation angle and range measurements, or
elevation angle and range measurements from which a measured vertical distance above the conventional, stationary reference point is determined.

15. The method of claim 12, wherein the internally-sourced vertical travel data is comprised of blended vertical travel data derived by subjecting vertical travel data from at least two sources of navigation data to a blending algorithm.

16. The method of claim 12, further comprising:
blending the internally-sourced vertical travel data if the internally-sourced vertical travel data is received from at least two sources of navigation data.

17. The method of claim 12, further comprising:
providing the instant height data to a presentation system configured to present the instant vertical distance above the conventional, stationary reference point represented in the instant height data, whereby
such instant vertical distance is presented
visually on the screen of a display unit,
aurally through an aural alert unit,
tactilely through a tactile alert unit, or
any combination thereof.

18. The method of claim 12, further comprising:
receiving navigation data comprised of first altitude data representative of a first altitude of the aircraft;
receiving reference point data comprised of elevation data representative of the elevation of the conventional, stationary reference point,
determining second altitude data representative of a second altitude of the aircraft as a function of the instant height data and the elevation data;
determining a validity of the first altitude data by comparing the first altitude data with the second altitude data; and
generating validity advisory data responsive to the validity determination, where
the validity advisory data is representative of validity information.

19. The method of claim 18, wherein
the first altitude data is determined to be valid when
a tolerance limit is employed and defined, and
the difference between the first altitude data and the second altitude data is within the tolerance limit.

20. A method for employing aircraft height data to validate aircraft altitude data, such method comprising:
receiving instant height data representative of an instant vertical distance above a conventional, stationary reference point, where
the conventional, stationary reference point is defined by at least a known geographic position, and
the instant height data is based upon airborne radar-based reflection data that is updated by vertical travel data;
receiving navigation data comprised of first altitude data representative of a first altitude of the aircraft;
receiving reference point data comprised of elevation data representative of the elevation of the conventional, stationary reference point;
determining second altitude data representative of a second altitude of the aircraft as a function of the instant height data and the elevation data;

determining a validity of the first altitude data by comparing the first altitude data with the second altitude data; and generating validity advisory data responsive to the validity determination, where the validity advisory data is representative of validity information.

21. The method of claim 20, wherein
the first altitude data is determined to be valid when
 a tolerance limit is employed and defined, and
 the difference between the first altitude data and the second altitude data is within the tolerance limit.

22. The method of claim 20, further comprising:
providing the validity advisory data to a presentation system configured to present the validity information represented in the validity advisory data, whereby
 such validity information is presented
  visually on the screen of a display unit,
  aurally through an aural alert unit,
  tactilely through a tactile alert unit, or
  any combination thereof.

\* \* \* \* \*